United States Patent [19]
Ernst et al.

[11] Patent Number: 5,973,047
[45] Date of Patent: Oct. 26, 1999

[54] MOISTURE-CURING SEALING AND BONDING COMPOUND

[75] Inventors: Wolfgang Ernst, Duesseldorf; Martin Majolo, Erkelenz; Johann Klein, Duesseldorf; Michael Dziallas, Haan; Tore Podola, Monheim, all of Germany

[73] Assignee: Henkel Kommanditgesellschaft auf Aktien, Duesseldorf, Germany

[21] Appl. No.: 08/952,246

[22] PCT Filed: Apr. 9, 1996

[86] PCT No.: PCT/EP96/01512

§ 371 Date: Oct. 15, 1997

§ 102(e) Date: Oct. 15, 1997

[87] PCT Pub. No.: WO96/33249

PCT Pub. Date: Oct. 24, 1996

[30] Foreign Application Priority Data

Apr. 15, 1995 [DE] Germany ............... 195 14 265

[51] Int. Cl.$^6$ ................... C08K 5/11; C09J 4/00
[52] U.S. Cl. ............ 524/312; 156/327; 156/329; 156/331.7; 524/313; 524/588; 524/590
[58] Field of Search ............... 524/313, 590, 524/312, 609, 588; 156/329, 331.7, 327; 525/474, 454

[56] References Cited

U.S. PATENT DOCUMENTS

| | | | |
|---|---|---|---|
| Re. 33,755 | 11/1991 | Downey et al. | 524/590 |
| Re. 33,761 | 12/1991 | Brauer et al. | 524/310 |
| 3,246,671 | 4/1966 | Stein et al. | 138/109 |
| 3,476,695 | 11/1969 | Quinn | 524/313 |
| 3,748,313 | 7/1973 | Bulkenke et al. | 524/609 |
| 4,096,131 | 6/1978 | Price et al. | 524/609 |
| 4,375,521 | 3/1983 | Arnold | 524/313 |
| 4,489,176 | 12/1984 | Kluth et al. | 156/331.4 |
| 4,687,533 | 8/1987 | Rizk et al. | 156/329 |
| 4,831,065 | 5/1989 | Pietsch et al. | 525/454 |
| 4,910,242 | 3/1990 | Podola et al. | 524/158 |
| 5,286,787 | 2/1994 | Podola et al. | 524/773 |
| 5,382,647 | 1/1995 | Daute et al. | 528/73 |
| 5,527,616 | 2/1997 | Hatano et al. | 524/313 |

FOREIGN PATENT DOCUMENTS

| | | |
|---|---|---|
| 0 457 088 | 11/1991 | European Pat. Off. |
| 22 20 401 | 11/1973 | Germany. |
| 37 26 547 | 2/1989 | Germany. |
| 39 43 090 | 7/1991 | Germany. |
| 40 32 843 | 4/1992 | Germany. |
| 51 74 653 | 7/1993 | Japan. |
| 52 63 061 | 10/1993 | Japan. |
| 61 72 163 | 6/1994 | Japan. |
| 1 418 571 | 12/1975 | United Kingdom. |

Primary Examiner—Veronica P. Hoke
Attorney, Agent, or Firm—Ernest G. Szoke; Wayne C. Jaeschke; Stephen D. Harper

[57] ABSTRACT

Described is a moisture-curing sealing and bonding compound made from completely synthetic polymers, the compound containing, to improve its non-sag properties, a triglyceride, either as the sole non-sag agent or in addition to prior art agents. The triglyceride should have a melting point over 40° C., preferably over 50° C., and be derived from saturated fatty acids with 8 to 26 C-atoms. Even without using thixotropic agents, compounds can be obtained which do not sag at temperatures over 40° C. Such joint sealants can be used to fill joints more than 35 mm wide without sagging.

31 Claims, No Drawings

MOISTURE-CURING SEALING AND BONDING COMPOUND

BACKGROUND OF THE INVENTION

This invention relates to a moisture-curing sealing and adhesive compound based on a fully synthetic polymer, to its production and to its use.

Polyurethane-based moisture-curing sealing compounds are well known to the expert, for example from DE 37 26 547 and DE 39 43 090. According to these documents, they consist essentially of isocyanate-terminated polyurethane prepolymers. The non-sag behavior of jointing compounds was achieved by the addition of fine-particle solids—also referred to as fillers. In general, these fine-particle solids make a significant contribution towards ensuring that the sealing compound retains the necessary internal cohesion after application to stop it from running or bulging downwards from vertical joints. The additives or fillers mentioned may be divided into pigments and thixotropicizing fillers, also referred in short as thixotropic agents. In the case of jointing compounds based on polyurethane prepolymers, these thixotropic agents have to meet additional requirements. For example, there should be no unwanted reactions with the isocyanate groups. Accordingly, the thixotropic agents mainly used are swellable polymer powders, for example polyacrylonitrile, polyurethane, polyvinyl chloride, polyacrylates, polyvinyl alcohols, polyvinyl acetates and the corresponding copolymers. Particularly good results can be obtained with fine-particle polyvinyl chloride powder.

The properties of polyurethane jointing compounds can be further improved by adding other components to the polymer powder used as thixotropic agent. These other components are substances which belong to the category of plasticizers or swelling agents and swelling aids used for plastics. The optimal composition of the prepolymer/polymer powder/plasticizer/swelling aid systems has to be determined in each case. For example, neither the plasticizer nor the swelling aid should react with the isocyanate groups of the prepolymer. Accordingly, plasticizers from the class of phthalic acid esters are suitable, for example, for polyvinyl chloride powder as the thixotropic agent. Examples of suitable compounds from this class are dioctyl phthalate, dibutyl phthalate and benzyl butyl phthalate. Other classes of compounds which have the required properties are chloroparaffins, alkyl sulfonic acid esters, for example of phenols or cresols, and fatty acid esters. Plasticizers based on alkyl sulfonic acid esters and polyvinyl chloride are particularly preferred as the swellable polymer powder.

Although satisfactory non-sag behavior is generally achieved with these known agents, it could be improved in certain cases, for example in the case of wide joints or at high temperatures. In addition, it is desirable for environmental reasons completely to replace PVC.

In the case of adhesives, too, there are applications where the form in which the adhesive is applied should remain intact, for example in bonding in bead form on vertical walls or in the application of floor adhesives with a serrated spatula.

Accordingly, the problem addressed by the present invention was largely to avoid these disadvantages and to improve the non-sag behaviour of sealing and adhesive compounds without affecting other processing and performance properties.

DETAILED DESCRIPTION OF THE INVENTION

This problem is solved by the incorporation of at least one triglyceride with no OH groups in the moisture-curing compounds based on fully synthetic polymers. One triglyceride is preferably used although two or three triglycerides may also be used.

Triglycerides in the context of the invention are esters of glycerol of which the three hydroxy groups are esterified with the same or different carboxylic acids.

Preferred carboxylic acids are aliphatic carboxylic acids of which the carbon chain is almost completely unbranched and which contain from 8 to 26 carbon atoms and, more particularly, from 10 to 22 carbon atoms. These fatty acids may be unsaturated, but are preferably saturated and, apart from the COOH groups, have no other functional groups.

The triglycerides should have a stable melting point of at least 40° C., preferably of at least 50° C. and not more than 90° C.

Accordingly, suitable triglycerides are trimyristin, tripalmitin, tristearin, 1-laurodimyristin, 1-laurodipalmitin, 2-laurodipalmitin, 1,3-dicaprinostearin, 2-palmitodistearin, 1,2-distearo-olein, 1,3-distearo-olein, 1,3-dipalmito-elaidin, 1-stearodibehenin, 1-lauro-2-myristo-3-palmitin, 1-lauro-2-myristo-3-stearin. Other suitable compounds are the triglycerides of the following acids: lauric acid, behenic acid and elaidic acid.

The triglycerides are used in a quantity of 0.1 to 50% by weight, preferably in a quantity of 0.2 to 30% by weight and more preferably in a quantity of 0.5 to 2% by weight, based on the compound as a whole. The higher the concentration of the triglyceride, the less the need for the usual agents for improving non-sag behavior. Beyond 10 and preferably beyond 15, their percentage content may be 0%.

The fully synthetic polymers are known moisture-curing polyurethanes, polysulfides, polyethers or silicones. The moisture-reactive groups are isocyanate and/or siloxane groups.

The moisture-curing compounds according to the invention preferably contain polyurethane prepolymers containing on average two or more isocyanate groups per molecule. These polyurethane prepolymers are prepared by mixing alcohols with a functionality of 2 or higher with an excess of isocyanate groups having a functionality of 2 or higher. The properties of the products may be influenced through the choice of the quantities used.

The polyol components used may be both low molecular weight and high molecular weight compounds. Low molecular weight compounds which may be used as polyol components for polyurethane prepolymers are, for example, ethylene glycol, propylene glycol, neopentyl glycol, butane-1,4-diol, hexane-1,6-diol and triols, such as glycerol, trimethylol propane or trimethylol ethane, and more highly functional hydroxy compounds, such as pentaerythritol.

Polyether polyols and/or polyester polyols are generally used as the relatively high molecular weight polyol component. Polyether polyols may be prepared by reaction of an epoxide or tetrahydrofuran with a low molecular weight polyol component, the epoxide used being selected, for example, from ethylene oxide, propylene oxide, butylene oxide, styrene oxide, cyclohexene oxide, trichlorobutylene oxide and epichlorohydrin and the polyol used being selected, for example, from such compounds as ethylene glycol, diethylene glycol and propylene glycol.

Polyesters as starting materials for polyurethane prepolymers are normally prepared by reacting hydroxyl compounds with carboxylic acids. The hydroxyl compounds may be selected from the low molecular weight polyfunctional hydroxyl components already mentioned. The acid component is a compound selected from the group consisting of adipic acid, phthalic acid, oxalic acid, maleic acid, succinic acid, glutaric acid, azelaic acid, sebacic acid and tricarboxylic acids. Suitable polyesters for the production of polyurethane prepolymers may also be obtained by ring-opening polymerization of, for example, ε-caprolactone or methyl-ε-caprolactone. Besides polyesters and polyethers as the polyol component, however, natural substances, so-called oleochemical polyols or, for example, castor oil, may also be used.

According to the invention, preferred polyols are polyether polyols, more particularly the polyether polyols obtainable by reaction of glycerol, propylene oxide adducts and polypropylene glycol.

The isocyanate component may be selected both from aromatic isocyanates and from aliphatic and/or cycloaliphatic isocyanates. Suitable isocyanates with a functionality of 2 and higher are, for example, the isomers of tolylene diisocyanate, isophorone diisocyanate, dicyclohexyl methane diisocyanate, tetramethylene diisocyanate, trimethyl hexamethylene diisocyanate, trimethyl xylene diisocyanate, hexamethylene diisocyanate and diphenyl methane diisocyanate or even triisocyanates, for example 4,4',4"-triphenyl methane triisocyanate. According to the invention, aromatic diisocyanates, especially technical diphenylmethane4,4"-diisocyanate (MDI) and 2,4-tolylene diisocyanate (TDI), are preferred.

In one preferred embodiment, the polyurethane prepolymer is prepared by reaction of a glycerol/propylene oxide adduct and/or a polypropylene glycol with technical diphenyl methane diisocyanate and/or technical tolylene diisocyanate. The isocyanate is preferably used in excess, so that the polyurethane prepolymer formed contains reactive NCO groups.

To improve their long-term resistance to weathering influences, the compounds, more particularly jointing compounds, contain reactive polysiloxanes. Reactive polysiloxanes are polysiloxanes which contain in the chain or side chain at least one group reactive to isocyanate-terminated components of the sealing compound and/or to the compounds formed therefrom as a result of moisture curing. Examples of such polysiloxanes are epoxy-modified polysiloxanes, polyhydrogen alkyl siloxanes and/or silanol-modified polysiloxanes. To the expert, epoxy-modified siloxanes are chemically reactive silicone oils containing modified epoxyalkyl side groups. In addition, polymethyl hydrogen siloxane may be present as the reactive polysiloxane. Silanol-modified siloxanes are alkyl siloxane polymers which contain at least one terminal silanol group. These so-called silanol oils may be regarded as reactive analogs of the usual silicone oils. The jointing compounds preferably contain hydroxy-terminated polydimethyl siloxane.

The non-sag behavior of compounds is generally achieved by the addition of fine-particle solids. By building up an internal structure, the sealant acquires the necessary internal cohesion after spray application to prevent the paste from running or bulging downwards from vertical joints. Accordingly, the additives mentioned are often referred to as thixotropicizing fillers or thixotropic agents. In the case of jointing compounds based on polyurethane prepolymers, the thixotropic agents have to meet additional requirements. For example, there must be no unwanted reactions with the isocyanate groups. Accordingly, inorganic fillers, such as chalk and heavy spar, or swellable polymer powders are mainly used as thixotropic agents.

Examples of swellable polymer powders are polyacrylonitrile, polyurethane, polyvinyl chloride, polyacrylates, polyvinyl alcohols, polyvinyl acetates and the corresponding copolymers. Particularly good results are normally obtained with fine-particle polyvinyl chloride powder.

The properties of the compound can be further improved by adding other components to the polymer powder used as the thixotropic agent. These other components are substances which belong to the categories of plasticizers and swelling agents used for plastics. The optimum composition of the reactive polymer/polymer powder/plasticizer/swelling aid systems has to be determined in each case. This will not present any difficulties to the expert. Apart from the considerations normally involved in selecting the components for such systems, the only requirement to be satisfied is that the plasticizer and swelling aid should not react with the reactive groups of the polymer. Accordingly, plasticizers from the class of phthalic acid esters are suitable, for example, for polyvinyl chloride as the thixotropic agent. Examples of suitable compounds from this class are dioctyl phthalate, dibutyl phthalate and benzyl butyl phthalate. Other classes of compounds which have the required properties are chloroparaffins, alkyl sulfonic acid esters of phenol and cresol and fatty acid esters. Plasticizers based on an alkyl sulfonic acid ester and polyvinyl chloride as the swellable polymer powder are particularly preferred for the process according to the invention.

Suitable swelling aids are low molecular weight organic substances which can be mixed with the polymer powder and the plasticizer, but which do not react with the isocyanate groups of the polyurethane prepolymer. Examples of such swelling aids can be found by the expert in the relevant textbooks on plastics and polymers. Preferred swelling aids for polyvinyl chloride powder are esters, ketones, aliphatic hydrocarbons, aromatic hydrocarbons and alkyl-substituted aromatic hydrocarbons. The last of these swelling aids, particularly xylene, are used as preferred swelling aids for polyvinyl chloride powder in accordance with the present invention.

The pigments and dyes used in the joint sealing compound according to the invention are any of the substances known for this purpose, such as titanium dioxide, iron oxides and carbon black.

To improve stability in storage, stabilizers, such as benzoyl chloride, acetyl chloride, toluene sulfonic acid methyl ester, carbodiimides and/or polycarbodiimides, are added to the jointing compounds in known manner. Olefins containing 8 to 20 carbon atoms proved to be particularly effective stabilizers. Besides their stabilizing effect, the stabilizers may also act as plasticizers and swelling agents. Preferred stabilizers are olefins containing 8 to 18 carbon atoms, particularly if the double bond is in the 1,2-position. The best results are obtained when the stabilizers have a linear molecular structure.

In addition, the compounds according to the invention may contain catalysts, such as dibutyl tin dilaurate, diacetate and/or tin(II) octoate, in catalytically active quantities to accelerate the reaction. Other auxiliaries in the context of the teaching according to the invention are, for example, hardeners, drying agents and primers.

The mixture of moisture-reactive polymer, filler, plasticizer, swelling aids, pigments and dyes, reactive polysiloxanes, stabilizers, catalysts and other auxiliaries used in the compound according to the invention has to be carefully coordinated according to the requirements which the compound is expected to satisfy in each particular case.

Preferred sealing compounds, particularly jointing compounds, in the context of the teaching according to the invention are those containing 20 to 40% by weight and, more particularly, 25 to 35% by weight of polyurethane prepolymer, 0 to 50% by weight and, more particularly, 15 to 35% by weight of a filler, more particularly a swellable polymer powder, 0 to 35% by weight and, more particularly, 20 to 30% by weight of plasticizers or swelling agents, 0 to 10% by weight and, more particularly, 3 to 7% by weight of swelling aids, 0 to 10% by weight and, more particularly, 4 to 9% by weight of pigments and dyes, 0 to 10% by weight and, more particularly, 1 to 5% by weight of stabilizers, 0 to 12% by weight and, more particularly, 1 to 10% by weight of reactive polysiloxanes, 0 to 10% by weight and, more particularly, 0.01 to 2% by weight of catalysts and other auxiliaries and 0.5 to 50% by weight and, more particularly, 1 to 30% by weight of triglycerides.

The adhesives according to the invention are based above all on moisture-reactive polyurethane prepolymers.

In the production of the sealing and adhesive compounds according to the invention, it is advisable initially to homogenize the triglyceride while heating with about the same quantity of another component, for example a plasticizer, an extender, a high boiler . . . Stirring can be useful, but is not necessary. The gel-like mixture obtained is mixed with the remaining components.

In the production of the jointing compound according to the invention, it is important to adopt the following procedure: the components are mixed in a suitable mixing unit, for example in a heatable and evacuable planetary dissolver, in the absence of atmospheric moisture and the resulting mixture is exposed to elevated temperatures. The maximum temperature is up to 5° K. above the melting point of the triglyceride. It is advisable not to add the catalyst until after the product is cooled. Before being packed in containers, the products should be degassed by reducing the pressure, for example to 20 mbar.

It was surprising to find that even small quantities of fatty acid triglyceride drastically improved non-sag behavior at 45° C. It was also surprising to find that, at high concentrations, there is no need at all for other stabilizers. Another advantage is the low offset yield stress at temperatures of around −20° C.

It is also surprising that foams are stabilized. If, for example, air is added to a PUR adhesive according to the invention, followed by evacuation, a foam-like adhesive with about three times the volume of the solid compound is formed. The foam structure remains intact even at normal pressure. This is not the case in the absence of triglyceride. Finally, stringing was shortened in the PUR adhesive according to the invention. This is of advantage where the adhesive is applied by spatula.

The addition of a triglyceride of saturated fatty acids to PU sealants improves the non-sag behavior of the sealant, particularly in wide joints and in overhead joints. In addition, non-sag behavior is improved at temperatures above 40° C. without any adverse effect on sprayability. This results in greater safety of application at summer temperatures. If non-sag behavior were to be achieved by increasing the PVC content and/or by reducing the plasticizer content, sprayability would suffer considerably. In addition, this would involve an unwanted increase in the offset yield stress values, which is not the case with the jointing compounds according to the invention.

The invention is illustrated by the following Examples.

EXAMPLES

EXAMPLE 1

A) Components of the jointing compound
a) The fatty acid triglyceride is the glycerol stearate Edenor-NHTi of Henkel KGaA.
b) The PVC powder is the product Solvic 373MC of Solvay.
c) The plasticizer is the alkyl sulfonic acid ester Mesamoll of Bayer AG.
d) The swelling aid is xylene.
e) The pigment is titanium dioxide from Kronos Titan.
f) The viscosity stabilizers are olefins from Gulf.
g) The UV stabilizers are the benzotriazole derivatives Tinuvin 328 of Ciba-Geigy.
h) The catalyst is the dibutyl tin dilaurate Standere TL of Akzo.
i) The PU prepolymer is a product of Sichel.

B) Production of the jointing compounds

Jointing compounds A to D were prepared as follows from the above components in the quantities shown below (parts by weight):

|  | Jointing Compounds | | | |
| --- | --- | --- | --- | --- |
| Components | A | B | C | D |
| Polyurethane prepolymer | 2500 | 2500 | 2500 | 2500 |
| Polyvinyl chloride powder | 2900 | 2900 | 2900 | 2900 |
| Plasticizer | 2200 | 2200 | 2200 | 2200 |
| Pigment | 1200 | 1200 | 1200 | 1200 |
| Swelling aid | 520 | 520 | 520 | 520 |
| Viscosity stabilizer | 500 | 500 | 500 | 500 |
| UV Stabilizer | 80 | 80 | 80 | 80 |
| Catalyst | 1 | 1 | 1 | 1 |
| Fatty acid triglyceride | 0 | 100 | 150 | 200 |

C) Tests

The above sealants were subjected to the following tests:
a) Offset yield stress according to DIN 52455-NWT-1-A2-100.
b) Non-sag behavior according to DIN 52454-ST-U26-70.
c) Non-sag behavior according to DIN 52454-ST-U26-70 with the following modifications:
   4 profiles with L:B:D dimensions of 250:50:25 mm
   the backfilling material is non-fixed PE tape
   the sealant, application guns and U profiles are stored at 45° C. The sealant is introduced into the profiles at 45° C.
   The U profiles are vertically suspended at 45° C.

D) Results

Stable: the jointing compound remains entirely within the joint. It showed only one bulge at the lower end of the joint.
Unstable: the jointing compound had run completely from the joint.

|  | Sealant | | | |
| --- | --- | --- | --- | --- |
| Test | A | B | C | D |
| a) [N/mm²] | 0.25 | 0.23 | 0.24 | 0.23 |
| b) [mm] | <2 mm | <2 mm | <2 mm | <2 mm |
| c) | Unstable | Stable | Stable | Stable |

EXAMPLE 2

A) The components
a) The drying agent used was the tosyl isocyanate known as Zusatzmittel TI of Bayer AG.
b) The glycidyl oxypropyl trimethoxysilane known as Silan A187 of Union Carbide was used as the silane coupling agent.

The other components were identical with those of Example 1.

B) Production of the jointing compound according to the invention

A filler was prepared from the components listed in the following Table. All the starting components were added in a vacuum planetary dissolver operating at high speed until a minimum temperature of 50° C. was reached. The compound was then degassed and packed in containers.

| | |
|---|---|
| PU prepolymer | 14250 |
| TiO$_2$ pigment | 1500 |
| UV stabilizer | 170 |
| Drying agent | 40 |
| Silane coupling agent | 40 |
| Catalyst | 1 |
| Fatty acid triglyceride | 4000 |

C) Results

A PVC-free sealing compound with the following technical data was obtained; not only the non-sag behavior of the sealing compound, but also its offset yield stress of 0.11 N/mm$^2$, as determined by test No. 1, is particularly worth noting.

a) Offset yield stress
   according to DIN 52455-NWT-1 -A2-100: 0.11 N/mm$^2$
b) Offset yield stress
   according to DIN 52455-WL-1-V6-100: 0.48 N/mm$^2$
c) Non-sag behavior
   according to DIN 52454-ST-U26-50: 1.5 mm
d) Resilience
   according to DIN 52458-BR-1 -V6-150: 83%
e) Breaking elongation
   in accordance with DIN 52455-NWT-1-A2: >900%

What is claimed is:

1. A method of sealing a joint comprising using to seal said joint a compound comprised of
   (a) at least one moisture-curing fully synthetic polymer selected from the group consisting of polyurethane prepolymers containing an average of at least two isocyanate groups per molecule, polysulfides containing moisture-reactive groups, polyethers containing moisture-reactive groups, and silicones containing moisture-reactive groups; and
   (b) from 0.1 to 50% by weight, based on the compound as a whole, of at least one triglyceride having a melting point of at least 40° C. and characterized by an absence of functional groups other than ester groups.

2. The method of claim 1 wherein the melting point of the triglyceride is from 50° C. to 90° C.

3. The method of claim 1 wherein the triglyceride is an ester of glycerol esterified with saturated fatty acids containing 8 to 26 carbon atoms, said saturated fatty acids being the same or different.

4. The method of claim 1 wherein said compound contains from 0.2 to 30% by weight of the triglyceride.

5. The method of claim 1 wherein said triglyceride is selected from the group consisting of trimyristin, tripalmitin, 1-laurodimyristin, 1-laurodipalmitin, 2-laurodipalmitin, 1,3-dicaprinostearin, 2-palmitodistearin, 1,2-distearo-olein, 1,3-distearo-olein, 1,3-dipalmito-elaidin, 1-stearodibehenin, 1-lauro-2-myristo-3-palmitin, 1-lauro-2-myristo-3-stearin and mixtures thereof.

6. The method of claim 1 wherein the compound additionally comprises at least one filler.

7. The method of claim 6, wherein said filler is at least one swellable polymer powder.

8. The method of claim 7 wherein the compound additionally comprises at least one swelling aid.

9. The method of claim 1 wherein the compound additionally comprises at least one plasticizer.

10. The method of claim 1 wherein the compound additionally comprises at least one pigment or dye.

11. The method of claim 1 wherein the compound additionally comprises at least one reactive polysiloxane.

12. The method of claim 1 wherein the compound additionally comprises at least one stabilizer.

13. The method of claim 1 wherein the compound additionally comprises at least one catalyst.

14. The method of claim 1 wherein the compound additionally comprises at least one thixotropic agent.

15. The method of claim 1 wherein the company additionally comprises at least one drying agents.

16. The method of claim 1 wherein the compound additionally comprises at least one silane coupling agent.

17. The method of claim 1 wherein said compound contains 20 to 40% by weight, based on the compound as a whole, of the polyurethane prepolymer.

18. The method of claim 1 wherein one or more polyurethane prepolymers containing an average of at least two isocyanate groups per molecule are used as the fully synthetic polymer.

19. A method of sealing a joint comprising using to seal said joint a compound comprised of
   (a) 20 to 40% by weight, based on the compound as a whole, of at least one moisture-curing polyurethane prepolymer containing an average of at least Two isocyanate groups per molecule; and
   (b) 0.2 to 30% by weight, based on the compound as a whole, of at least one triglyceride having a melting point of from 50° C. to 90° C. and characterized by an absence of functional groups other than ester groups.

20. The method of claim 19 wherein the compound additionally comprises 15 to 35% by weight of at least one swellable polymer powder, 3 to 7% by weight of at least one swelling aid, and 20 to 30% by weight of at least one plasticizer.

21. The method of claim 19 wherein the compound additionally comprises at least one additive selected from the group consisting of pigments, dyes, stabilizers, drying agents, silane coupling agents, thixotropic agents, reactive polysiloxanes and catalysts.

22. The method of claim 19 wherein the compound contains from 0.5 to 2% by weight of the triglyceride.

23. The method of claim 19 wherein the triglyceride is an ester of glycerol esterified with saturated fatty acids containing 10 to 22 carbon atoms, said saturated fatty acids being the same or different.

24. The method of claim 23 wherein at least one of the saturated fatty acids is selected from the group consisting of lauric acid, behenic acid, palmitic acid, myristic acid, and stearic acid.

25. The method of claim 19 wherein the polyurethane prepolymer is obtained by reacting a polyether polyol or polyester polyol with an excess of an aromatic diisocyanate.

26. The method of claim 19 wherein the triglycende is selected from the group consisting of trimyristin, tripalmitin, 1-laurodimyristin, 1-laurodipalmitin, 2-laurodipalmitin, 1,3-dicaprinostearin, 2-palmitodistearin, 1,2-distearo-olein, 1,3-distearo-olein, 1,3-dipalmito-elaidin, 1-stearodibehenin, 1-lauro-2-myristo-3-palmitin, 1-lauro-2-myristo-3-stearin and mixtures thereof.

27. The method of claim 19 wherein said joint has a width of more than 35 mm.

28. The method of claim 19 wherein said joint has a width of more than 50 mm.

29. The method of claim 19 wherein said joint is an overhead joint.

30. The method of claim 19 wherein said compound is cured by moisture.

31. A process for producing a moisture-curing sealing, jointing and adhesive compound, said process comprising (a) mixing at least one triglyceride having a melting point of at least 40° C. and characterized by an absence of functional groups other than ester groups while heating with about the same quantity of a component selected from the group consisting of plasticizers, extenders, high boilers and mixtures thereof to obtain a gel-like mixture, and (b) mixing the gel-like mixture with one or more moisture-curing fully synthetic polymers selected from the group consisting of polyurethane prepolymers containing an average of at least two isocyanate groups per molecule, polysulfides containing moisture-reactive groups, polyethers containing moisture-reactive groups, and silicones containing moisture-reactive groups.

* * * * *